US011159245B2

(12) United States Patent
Kowalevicz et al.

(10) Patent No.: US 11,159,245 B2
(45) Date of Patent: *Oct. 26, 2021

(54) METHODS AND APPARATUS FOR CAVITY ANGLE TUNING FOR OPERATING CONDITION OPTIMIZATION

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,011

(22) Filed: Jul. 2, 2020

(65) Prior Publication Data
US 2021/0006336 A1    Jan. 7, 2021

Related U.S. Application Data

(60) Provisional application No. 62/870,452, filed on Jul. 3, 2019.

(51) Int. Cl.
*H04B 10/61* (2013.01)
*G02B 5/28* (2006.01)
(Continued)

(52) U.S. Cl.
CPC ........... *H04B 10/615* (2013.01); *G02B 5/284* (2013.01); *H04B 10/54* (2013.01); *H04B 10/64* (2013.01); *H04J 14/02* (2013.01)

(58) Field of Classification Search
CPC ...... H04B 10/615; H04B 10/54; H04B 10/11; H04B 10/676; H04B 10/67; G02B 5/284;
(Continued)

(56) References Cited

U.S. PATENT DOCUMENTS 4,172,663 A    10/1979  Byer et al.
4,417,964 A    11/1983  Wolfrum et al.
(Continued)

FOREIGN PATENT DOCUMENTS

EP    0426357 A2    5/1991
JP    H06265832 A    9/1994
(Continued)

OTHER PUBLICATIONS

International Search Report and Written Opinion of International Patent Application No. PCT/US2020/028941 dated Sep. 23, 2020.
(Continued)

*Primary Examiner* — Abbas H Alagheband
(74) *Attorney, Agent, or Firm* — Lando & Anastasi, LLP (57) ABSTRACT

Apparatus, systems, and methods include leveraging the angular dependence of the angle of arrival of the incoming optical signal at an optical resonator and the output response signal to adjust the operating condition of the optical resonator. The optical resonator is dynamically tuned by rotating the optical resonator to optimize signal-to-noise ratio or other parameters for different modulation formats of the incoming optical signal or other different operating conditions.

20 Claims, 5 Drawing Sheets

(51) Int. Cl.
*H04B 10/54* (2013.01)
*H04B 10/64* (2013.01)
*H04J 14/02* (2006.01)

(58) Field of Classification Search
CPC .. G02B 26/001; G02B 6/29337; G02B 26/00; H04J 14/02
USPC .......................................................... 398/202
See application file for complete search history.

(56) References Cited

U.S. PATENT DOCUMENTS

| | | | |
|---|---|---|---|
| 4,980,892 A | 12/1990 | Cunningham et al. | |
| 5,777,768 A | 7/1998 | Korevaar | |
| 5,896,005 A | 4/1999 | Gurvitch et al. | |
| 5,912,748 A | 6/1999 | Wu et al. | |
| 6,868,237 B2 | 3/2005 | Willebrand et al. | |
| 6,882,764 B1 | 4/2005 | Deng et al. | |
| 7,039,278 B1 | 5/2006 | Huang et al. | |
| 7,158,281 B2* | 1/2007 | Chen | G02B 26/001 |
| | | | 257/E31.121 |
| 7,361,884 B2 | 4/2008 | Tanaka et al. | |
| 7,711,441 B2 | 5/2010 | Tillotson | |
| 7,907,648 B2 | 3/2011 | Matsui et al. | |
| 8,427,649 B2* | 4/2013 | Hays | G01S 17/58 |
| | | | 356/450 |
| 8,929,408 B1 | 1/2015 | Diels et al. | |
| 9,989,700 B1 | 6/2018 | Ayliffe et al. | |
| 10,432,315 B2* | 10/2019 | Chen | G02F 1/0121 |
| 2002/0030439 A1 | 3/2002 | Gurvitch et al. | |
| 2002/0122614 A1 | 9/2002 | Zhou et al. | |
| 2002/0171908 A1* | 11/2002 | Copner | G02B 6/29358 |
| | | | 359/278 |
| 2004/0013437 A1 | 1/2004 | Wiltsey et al. | |
| 2004/0080832 A1 | 4/2004 | Singh | |
| 2004/0080834 A1 | 4/2004 | Thompson | |
| 2005/0014472 A1 | 1/2005 | Cox et al. | |
| 2006/0140548 A1 | 6/2006 | Shin et al. | |
| 2006/0159135 A1 | 7/2006 | Cliche et al. | |
| 2006/0182154 A1 | 8/2006 | Tanaka et al. | |
| 2006/0262396 A1 | 11/2006 | Smith | |
| 2007/0076282 A1 | 4/2007 | Kourogi et al. | |
| 2009/0210191 A1* | 8/2009 | Rogers | G01J 5/0862 |
| | | | 702/134 |
| 2010/0135670 A1 | 6/2010 | Amadeo et al. | |
| 2010/0253948 A1 | 10/2010 | Strandjord et al. | |
| 2011/0242290 A1 | 10/2011 | Arai | |
| 2011/0273758 A1 | 11/2011 | Wang et al. | |
| 2012/0147361 A1 | 6/2012 | Mochizuki et al. | |
| 2012/0154542 A1 | 6/2012 | Katz et al. | |
| 2013/0099140 A1 | 4/2013 | Nakarai et al. | |
| 2013/0126755 A1 | 5/2013 | Kemnitz | |
| 2013/0278933 A1* | 10/2013 | Nozawa | G02B 26/001 |
| | | | 356/419 |
| 2014/0240711 A1* | 8/2014 | Matsushita | G01J 3/26 |
| | | | 356/451 |
| 2014/0314406 A1 | 10/2014 | Zerbe et al. | |
| 2016/0043794 A1 | 2/2016 | Ashrafi et al. | |
| 2016/0047987 A1 | 2/2016 | Du et al. | |
| 2016/0064894 A1 | 3/2016 | Takiguchi et al. | |
| 2016/0259185 A1 | 9/2016 | Osumi et al. | |
| 2016/0349284 A1 | 12/2016 | Pradhan et al. | |
| 2016/0357189 A1 | 12/2016 | Barrows et al. | |
| 2016/0363648 A1 | 12/2016 | Mindell et al. | |
| 2018/0019807 A1 | 1/2018 | Hreha et al. | |
| 2018/0054259 A1 | 2/2018 | Kowalevicz et al. | |
| 2018/0091227 A1* | 3/2018 | Dolgin | H04B 10/5561 |
| 2018/0091228 A1* | 3/2018 | Kowalevicz | G02F 2/00 |
| 2018/0091230 A1 | 3/2018 | Dolgin et al. | |
| 2018/0091232 A1* | 3/2018 | Dolgin | H01S 3/08031 |
| 2018/0102853 A1 | 4/2018 | Dolgin et al. | |
| 2018/0145764 A1 | 5/2018 | Dolgin et al. | |
| 2018/0145765 A1* | 5/2018 | Kowalevicz | H04B 10/615 |
| 2018/0167145 A1* | 6/2018 | Dolgin | H04B 10/11 |
| 2018/0212682 A1 | 7/2018 | Chen et al. | |
| 2018/0234231 A1 | 8/2018 | Dolgin et al. | |
| 2018/0275050 A1* | 9/2018 | Iguchi | G02F 1/365 |
| 2018/0367223 A1 | 12/2018 | Graceffo et al. | |
| 2019/0007091 A1 | 1/2019 | Graceffo et al. | |
| 2019/0158208 A1* | 5/2019 | Dolgin | H04B 10/66 |
| 2019/0208183 A1 | 7/2019 | Schmidt et al. | |
| 2019/0257990 A1 | 8/2019 | Hunter et al. | |
| 2019/0295264 A1 | 9/2019 | Petilli | |
| 2019/0305853 A1 | 10/2019 | Dolgin et al. | |
| 2019/0319714 A1 | 10/2019 | Kowalevicz et al. | |
| 2019/0331941 A1 | 10/2019 | Coolbaugh et al. | |
| 2020/0096504 A1 | 3/2020 | Kawata et al. | |
| 2020/0278272 A1* | 9/2020 | Kasahara | G01M 11/0285 |
| 2020/0403709 A1 | 12/2020 | Graceffo et al. | |
| 2021/0021775 A1 | 1/2021 | Lee | |

FOREIGN PATENT DOCUMENTS

| | | |
|---|---|---|
| WO | 8500484 A1 | 1/1985 |
| WO | 2007016537 A2 | 2/2007 |

OTHER PUBLICATIONS

Invitation to Pay Additional Fees from the International Searching Authority in International Patent Application No. PCT/US2020/042160 dated Oct. 16, 2020.
International Search Report and Written Opinion of International Patent Application No. PCT/US2020/040751 dated Oct. 19, 2020.
International Search Report and Written Opinion in International Patent Application No. PCT/US2020/042160 dated Dec. 7, 2020.
Ball, D.W., "Field Guide to Spectroscopy," SPIE Press, Bellingham, WA (2006), https://spie.org/publications/fg08_p13_index_of_refraction?SSO=1.

* cited by examiner

METHODS AND APPARATUS FOR CAVITY ANGLE TUNING FOR OPERATING CONDITION OPTIMIZATION

CROSS-REFERENCE TO RELATED APPLICATIONS

This application claims the benefit of priority under 35 USC § 119(e) to U.S. Provisional Patent Application Ser. No. 62/870,452, filed on Jul. 3, 2019, and titled "METHODS AND APPARATUS FOR CAVITY ANGLE TUNING FOR OPERATING POINT OPTIMIZATION," which is incorporated herein by reference in its entirety.

BACKGROUND

Many optical communication systems manipulate light waves to carry information. For instance, often a light source (e.g., a laser source) is modulated to change various properties of emitted light, such as an amplitude, phase, or frequency of the light to convey information. An optical receiver may receive and demodulate the light waves to recover the information. However, conventional methods of demodulation of coherent signals are either complicated and expensive (e.g., using a local oscillator), or fixed (in data rate and modulation format, for example) and limited.

SUMMARY OF INVENTION

Aspects and embodiments are directed to methods, apparatus, and systems that provide a passive modulation approach that allows for variable data rate, different wavelengths and different modulations formats to be demodulated based on rotating an optical cavity resonator, such as an etalon, that forms part of the demodulator. Certain aspects and embodiments advantageously provide a flexible, low-cost solution that may be particularly application to fiber-based or short-range free-space optical communications, for example.

According to one embodiment, an optical receiver comprises an optical resonator assembly including at least one optical resonator and at least one actuator coupled to the at least one optical resonator and configured to rotate the at least one optical resonator in response to a control signal, the at least one optical resonator being configured to receive an input optical signal, to accumulate optical signal energy inside the at least one optical resonator based at least in part on the input optical signal, and to produce an intensity modulated output optical signal, an intensity modulation of the output optical signal being representative of a modulation of the input optical signal, a detector configured to detect the intensity modulated output optical signal and to identify the modulation of the input optical signal based at least in part on the intensity modulation of the output optical signal, and a controller coupled to the detector and to the optical resonator assembly, the controller being configured to provide the control signal to control the at least one actuator to rotate the at least one optical resonator to tune the at least one optical resonator to a selected operating condition.

In one example, the at least one optical resonator is a Fabry-Perot etalon.

In another example, the at least one optical resonator includes: a first semi-reflective surface positioned to receive the input optical signal, and a second semi-reflective surface positioned facing the first semi-reflective surface, wherein the at least one optical resonator is configured to accumulate the optical signal energy inside the at least one optical resonator and between the first semi-reflective surface and the second semi-reflective surface to approach a steady-state output value of the output optical signal, the intensity modulation of the output optical signal including a series of deviations from the steady-state output value.

In one example, the modulation of the input optical signal is phase modulation, frequency modulation, intensity modulation, or a combination thereof.

In another example, the selected operating condition of the at least one optical resonator is an on-resonance operating condition of the at least one optical resonator.

In one example, the selected operating condition of the at least one optical resonator is an off-resonance operating condition of the at least one optical resonator.

In another example, the at least one optical resonator includes a plurality of optical resonators.

In one example, the at least one actuator includes a plurality of actuators each coupled to at least one optical resonator of the plurality of optical resonators.

In another example, the controller is configured to control the actuator to rotate the at least one optical resonator in response to the modulation of the input optical signal changing.

In one example, the intensity modulated output optical signal is an optical signal reflected from the at least one optical resonator.

In another example, the detector is further configured to identify the modulation of the input optical signal based at least in part on distinguishing between a positive and a negative phase transition of the input optical signal.

In one example, the detector is further configured to identify the modulation of the input optical signal based at least in part on determining a maximum change in intensity of the modulated output optical signal during a phase change of the input optical signal.

According to another embodiment, a method of demodulating a modulated optical signal comprises receiving the modulated optical signal with at least one optical resonator, accumulating optical signal energy inside the at least one optical resonator based at least in part on the modulated optical signal to produce an intensity modulated output optical signal, an intensity modulation of the output optical signal being representative of the modulation of the modulated optical signal, rotating the at least one optical resonator to select an operating condition of the at least one optical resonator, the intensity modulation of the output optical signal being dependent on the operating condition of the at least one optical resonator, detecting the intensity modulated output optical signal, and identifying the modulation of the modulated optical signal based at least in part on the intensity modulation of the output optical signal.

In one example, the at least one optical resonator includes rotating the at least one optical resonator to select the operating condition of the at least one optical resonator based on the modulation of the modulated optical signal.

In another example, the operating condition of the at least one optical resonator is an on-resonance operating condition of the at least one optical resonator, and wherein accumulating the optical signal energy inside the at least one optical resonator includes accumulating resonant optical signal energy inside the at least one optical resonator.

In one example, the operating condition of the at least one optical resonator is an off-resonance operating condition of the at least one optical resonator.

In another example, the at least one optical resonator includes a plurality of optical resonators, and wherein rotating the at least one optical resonator includes individually rotating each of the plurality of optical resonators to select different operating conditions for each of the plurality of optical resonators.

In one example, the intensity modulated output optical signal is an optical signal reflected from the at least one optical resonator.

In another example, identifying the modulation of the modulated optical signal based at least in part on the intensity modulation of the modulated output optical signal includes distinguishing between a positive and a negative phase transition of the modulated optical signal.

In one example, identifying the modulation of the modulated optical signal based at least in part on the intensity modulation of the modulated output optical signal includes determining a maximum change in intensity of the modulated output optical signal during a phase change of the modulated optical signal.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Many optical communication systems manipulate light waves to carry information. For instance, often a light source (e.g., a laser source) is modulated to change various properties of emitted light, such as an amplitude, phase, or frequency of the light to convey information. An optical receiver may receive and demodulate the light waves to recover the information. Optical receivers according to certain embodiments use an optical resonator, such as a Fabry-Perot etalon, an optical delay line, or other bulk optical cavity that accumulates energy, as a modulation converter. Using an optical resonator assembly in the demodulator of an optical receiver may offer advantages over conventional demodulation techniques, including the ability to demodulate coherent optical signals with wavefront distortion without the need for adaptive optics or a coherent receiver. The arriving optical signals may be phase modulated, amplitude modulated, or frequency modulated, or may be modulated using a combination of these techniques (e.g., QAM methods), and the optical resonator assembly converts the received phase, amplitude, and/or frequency modulated optical signal into a directly detectable intensity modulated output signal.

The optical resonator(s) within the optical resonator assembly may be sensitive to the angle of arrival of the incoming optical signal, and its output response signal may change as a function of that angle. For example, optical cavities/resonators typically have characteristics, such as the optical path length through the cavity and the resonant condition that may vary as a function of the angle of arrival of optical radiation received by the cavity; changing the resonant condition will change the operating point of the resonator acting as a demodulator. For example, conventionally the resonant condition of a F-P cavity is $L=N\lambda/2$ where $\lambda$ is the wavelength of light and $L$ is the length of the resonator. According to aspects and embodiments of the disclosure, the optical resonator is operated at the "operating point" $L=N\lambda/2+\Delta L$ where $\Delta L$ is not zero and strictly controlled so as to provide an operating condition. Accordingly, in certain instances, angle tuning (i.e., deliberately orienting or positioning the cavity to receive optical radiation at a given angle of incidence) can be used to change the optical path length through the optical cavity to achieve a certain resonance with a given wavelength of the optical radiation. Aspects and examples described herein provide apparatus, systems, and methods for leveraging this angular dependence to adjust an operating condition of an optical resonator to controllably adjust its transmission and/or reflection characteristics and intensity response to signal modulation changes. For example, according to aspects and embodiments of the disclosure, the optical resonator is operated at the "operating point" $L=N\lambda/2+\Delta L$ where $\Delta L$ is not zero and strictly controlled so as to provide the operating condition. Thus, an optical resonator in an optical receiver can be dynamically tuned to optimize signal-to-noise ratio or other parameters for different modulation formats of an incoming optical signal or different angles of arrival/incidence.

It is to be appreciated that embodiments of the methods and apparatus discussed herein are not limited in application to the details of construction and the arrangement of components set forth in the following description or illustrated in the accompanying drawings. The methods and apparatus are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

Figure 1:
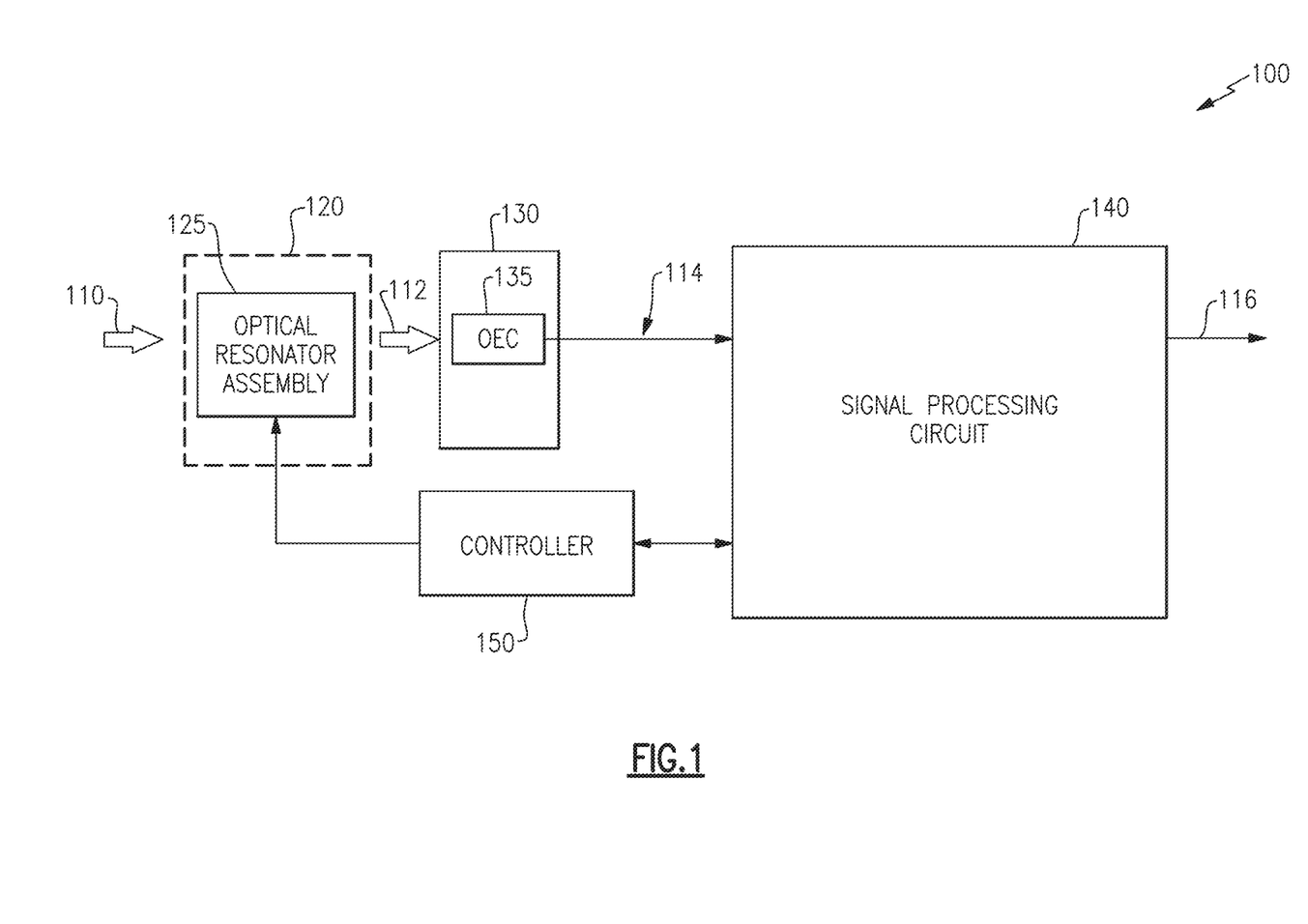
FIG. 1 is a functional block diagram of one example of an optical receiver according to certain aspects of the present invention.

FIG. 1 is a block diagram of one example of an optical receiver according to certain embodiments. The optical receiver 100 receives a modulated incoming optical signal 110 transmitted along a free space signal path (e.g., free space optical, FSO), a fiber coupling, or another waveguide system from a transmitter (not shown). The optical receiver 100 includes a demodulator 120 that includes an optical resonator assembly 125, a detector assembly 130 including at least one optical-electrical converter (OEC) 135, and a signal processing circuit 140. In certain examples, the detector assembly 130 and the signal processing circuit 140 may be collectively referred to as a detector. The detector assembly 130 and the signal processing circuit 140 may be separate components or may be part of a common module. The optical resonator assembly 125 is positioned to receive the modulated optical signal 110 and to produce an output optical signal 112 that has characteristics representative of the modulation of the modulated optical signal 110, as discussed further below. The detector assembly 130 receives the output optical signal 112 from the optical resonator assembly 125 and the at least one OEC 135 converts the optical signal 112 into an electrical signal 114 that can be processed by the signal processing circuit 140 to produce a decoded information signal 116. The decoded information signal 116 may include the information that was encoded on the modulated optical signal 110 by the modulation of the modulated optical signal 110. The OEC 135 may include one or more photodiodes, for example, or other components capable of transforming an optical signal into an electrical signal. The signal processing circuit 140 may include various components, as will be understood by those skilled in the art, such as analog-to-digital converters, filters, amplifiers, controllers, etc., to condition and process the electrical signals received from the detector assembly 130 to produce the decoded information signal 116. The optical receiver 100 may further include a controller 150 that may be coupled to the signal processing circuit 140 and to the optical resonator assembly 125 and configured to adjust parameters of the optical resonator assembly 125 to maintain a selected operating condition of the optical resonator assembly 125, as discussed in more detail below.

In certain examples, the optical resonator assembly 125 includes one or more optical resonators configured to convert the modulation of the modulated optical signal 110 into intensity modulation of the output optical signal 112. As noted above, the modulated optical signal 110 may be phase modulated, amplitude modulated, and/or frequency modulated. As used herein, the term "optical resonator" refers to a component capable of sensing variations, such as frequency variations, amplitude variations, or phase variations in the received incoming optical signal 110. Examples of optical resonators may include Fabry-Perot etalons or other types of optical resonators. Each optical resonator in the optical resonator assembly 125 converts the modulation of the incoming optical signal 110 in part by interaction of the incoming optical signal 110 with optical energy built-up in the resonator. Operation of an optical resonator as a phase change detector is discussed below using the example of an etalon; however, those skilled in the art will appreciate that other types of optical resonators can be operated according to similar principles. Further, the optical resonator may respond similarly to amplitude modulated or frequency modulated input optical signals.

Figure 2:
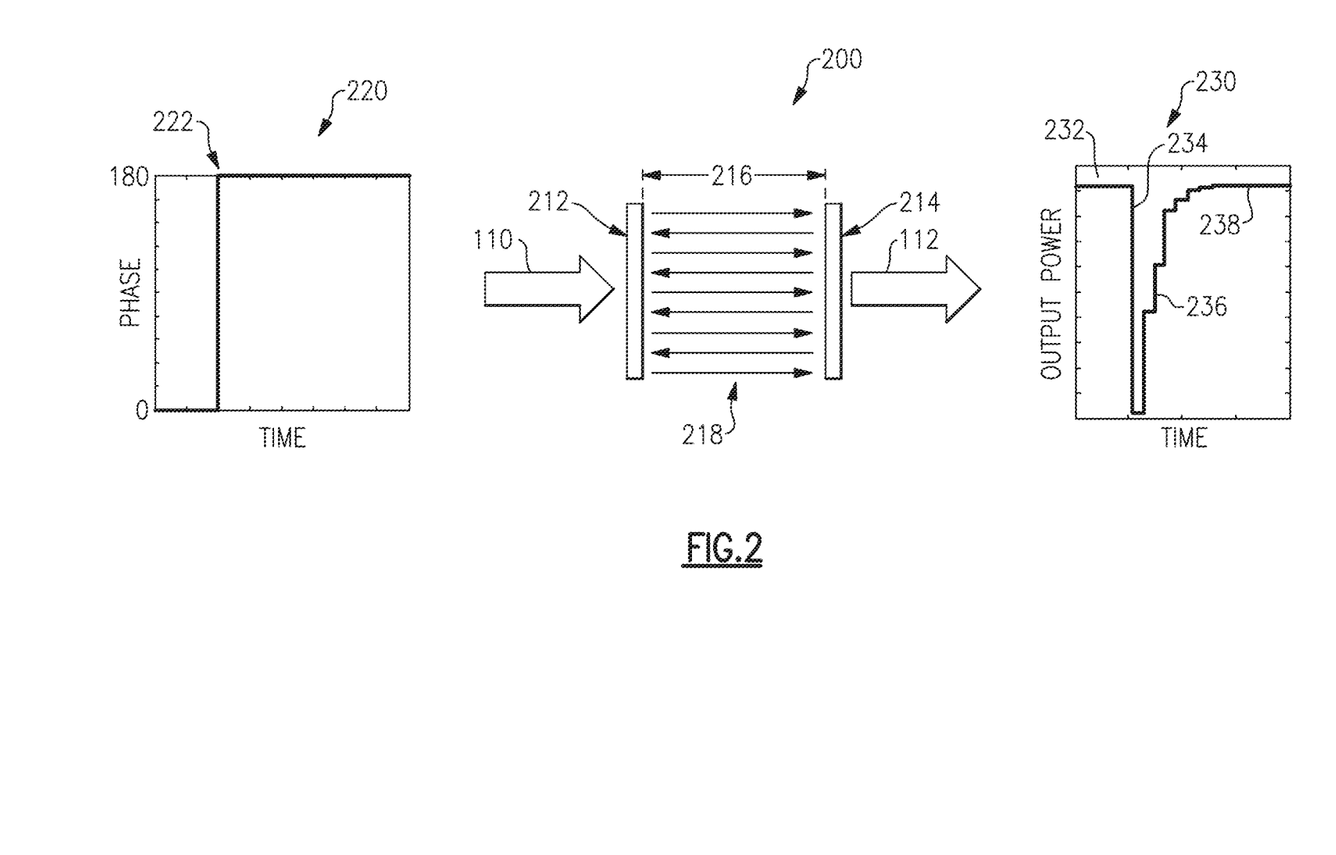
FIG. 2 is a diagram illustrating an example of operation of an etalon according to aspects of the present invention.

Referring to FIG. 2, in certain examples an etalon 200 is a component having a pair of parallel semi-reflective surfaces 212, 214 that may include an optically transparent material in between, and has a characteristic resonant frequency associated with a certain wavelength of light based upon the spacing (i.e., dimension 216) between the semi-reflective surfaces. The surfaces 212, 214 are semi-reflective and also semi-transmissive, in that they allow some light through, and therefore the modulated incoming optical signal 110 may be allowed into the etalon 200 and may resonate inside the etalon (i.e., in the interior 218 between the two semi-reflective surfaces 212, 214). Additionally, some of the light resonating inside is allowed out of the etalon 200 (through at least one of the semi-transmissive surfaces). Light emerging from the etalon 200 is shown, for example, as the output optical signal 112. In FIG. 2, the output optical signal 112 is shown emerging from the etalon 200 via the second semi-reflective surface 214; however, this depiction is merely for ease of illustration and not intended to be limiting; the output optical signal 112 in certain examples may in addition or alternatively be a reflected signal emerging via the first semi-reflective surface 212. The etalon 200 may have varying levels of reflectivity of the semi-reflective surfaces 212, 214. In certain examples, the reflectivity may be expressed as a fraction of light amplitude reflected back into the interior 218 or may be expressed as a fraction of light intensity reflected back into the interior 216. The reflectivity of each of the first and second semi-reflective surfaces 212, 214 may be the same or different, and may be any suitable value for a particular implementation.

The etalon 200 is one example of a suitable optical resonator in accord with aspects and embodiments described herein. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples. In the example shown in FIG. 2, the output intensity/power from the etalon 200 exhibits a transient disturbance that is a temporary reduction in power; however, in other configurations the transient disturbance may instead be a temporary increase in response to a phase (or amplitude or frequency) transition occurring in the modulated incoming optical signal 110.

The optical resonator assembly 125 may include one or more etalons 200, or other types of optical resonators that operate similarly to convert the modulation of the incoming optical signal 110 into the intensity-modulated output optical signal 112 which may then be detected and processed to recover the information encoded in the incoming optical signal 110. As discussed above, in various examples, each optical resonator within the optical resonator assembly 125 may have one or more characteristic resonant frequencies (alternatively referred to as a characteristic resonant wavelength). When the frequency of the incoming optical signal 110 corresponds to the characteristic resonant frequency of the optical resonator, optical signal energy accumulates to build-up resonating optical signal energy inside that optical resonator, as discussed above.

In certain examples, the at least one optical-electrical converter (OEC) 135 includes an additional OEC 135 (not shown) that is provided in the optical receiver 100 discussed above with reference to FIG. 1. The additional OEC 135 is configured to receive a reflected signal (not shown) from the optical resonator assembly 125. In an example, at least a portion of the arriving signal that is reflected off the first semi-reflective surface 212 is received by the additional OEC 135. Due to the complimentary nature of the transmitted and reflected signals, additional information of the arriving optical signal may be provided to the controller 150. The additional OEC 135 may include one or more photodiodes, for example, or other components capable of transforming the reflected optical signal into an electrical signal. According to certain aspects and examples, the controller 150 may be coupled to the signal processing circuit 140 and to the optical resonator assembly 125 and configured to adjust parameters of the optical resonator assembly 125 to maintain a selected operating condition of the optical resonator assembly 125 based on the output optical signal 112. In some embodiments, the output signal 112 may be the transmitted optical signal, the reflected signal, or any other signal that results from the interaction of the incoming optical signal 110 with energy stored within an optical resonator, such as etalon 200.

FIG. 2 shows a graph 220 of the modulated incoming optical signal 110, showing a phase change in the optical signal 110. The graph 220 plots the phase (vertical axis) of the optical signal 110 over time (horizontal axis), showing a phase transition of pi (180 degrees) at point 222. FIG. 2 also shows a graph 230 of optical signal intensity (as output power) emerging from the etalon 200 during the phase transition in the received optical signal 210. At region 232 the etalon 200 is in a steady-state resonance condition wherein a steady intensity of light emerges. At point 234, corresponding to point 222 in the graph 220, a phase transition occurs in the arriving optical signal 110, temporarily disrupting the steady-state and causing a change in the emerging light intensity. In some examples, the change is an increase in the emerging light intensity. In other examples, the change is a decrease in the emerging light intensity. During successive reflections inside the etalon 200, and indicated region 236 in the graph 230, resonance is re-establishing, and the emerging light intensity increases until, at point 238, a steady intensity of light emerges when the etalon 200 has returned to a steady-state condition. Thus, variations in the intensity of the output optical signal 112 from the etalon 200 indicate that a transition occurred in the incoming optical signal 110, such as a phase transition due to phase modulation of the optical signal 110. As discussed above, the etalon 200 may respond similarly to frequency and/or amplitude transitions that correspond to frequency or amplitude modulation, respectively, of the optical signal 110. Thus, the etalon 200 functions as a modulation converter for the optical signal 110. The output optical signal 112 may therefore carry the same information content as the arriving optical signal 110, but in an intensity modulated form, rather than a phase modulated form, for example. Further, the etalon 200 may function as a modulation converter when operating at various operating conditions, as discussed further below.

The resonance condition of the optical resonator depends on the wavelength, k, of the arriving optical signal 110 and the optical path length of the optical resonator. For example, referring again to FIG. 2, a tuned etalon 200 may have an interior dimension 216 that is selected such that the optical path length, L, (i.e., based upon the speed of light in the material of the interior 218) is an integer number of half-wavelengths, e.g., $L=n\lambda/2$, a resonant condition, where n is a positive integer. The optical path length is also dependent on the angle of incidence of the arriving optical signal 110 because that angle determines the angle at which the optical signal 110 travels between the first and second semi-reflective surfaces 212, 214. For a given wavelength, the optical path length of the etalon 200 is shortest for normal incidence, and increases as the angle of incidence of the optical signal 110 changes away from normal. For example, while the optical path length of the etalon 200 may be precisely $L=n\lambda/2$ (or some other chosen value) for a selected "baseline" angle of incidence, a, of the optical signal 110, the optical path length changes to $L'=n\lambda/2\pm\Delta L$ when the angle of incidence changes (e.g., $\alpha'=\alpha\pm\Delta\alpha$), where $\Delta L$ is a function of $\Delta\alpha$. The dependence of the optical path length of the etalon on the angle of incidence or angle of arrival of the incoming optical signal 110 in turn causes the tuning or resonance of the etalon 200 to be dependent on the angle of arrival of the incoming optical signal 110. Thus, etalon 200 is sensitive to the angle of arrival of the incoming optical signal 110 and, in general, the response of the etalon 200, or intensity/amplitude of the output optical signal 112, changes as a function of that angle.

Figure 3:
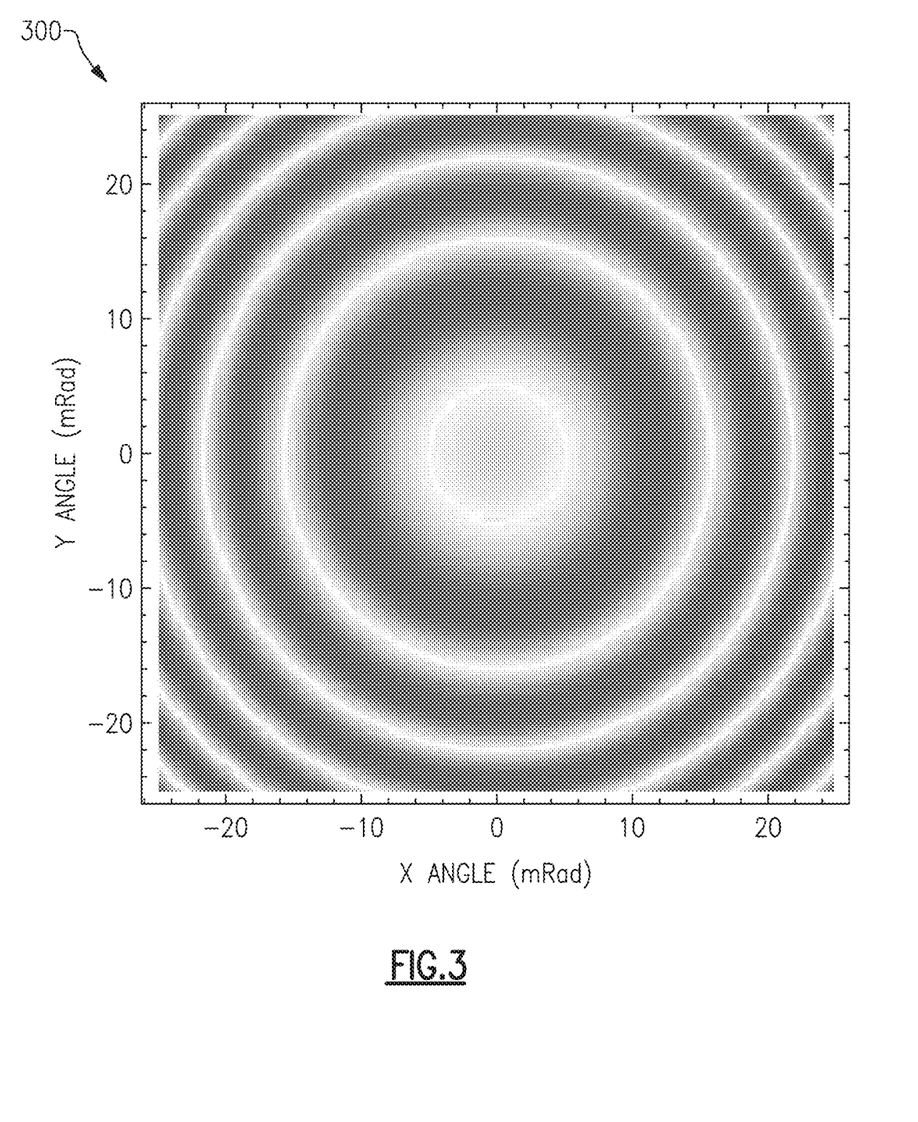
FIG. 3 is a graph illustrating an interference pattern at an optical resonator demonstrating the angular dependence of the operating condition of the optical resonator, in accord with aspects of the present invention.

FIG. 3 shows a representation of a steady-state intensity transmission pattern produced 300 by an example of the etalon 200 in response to receiving the incoming optical signal 110. The pattern is plotted in angular space, such that each point on the two-dimensional plot corresponds to an angle of arrival of the incoming optical signal 110 along the x and y axes. For any given angle of arrival, that point on the plot provides the amount of light, ranging from 1 to a minimum value (which may be near zero or some other minimum value). Thus, the pattern shows the transmitted intensity of light at approximately 1550 nm from the etalon 200 as a function of angle. In this example, the etalon 200 has an interior dimension 216 of approximately 10 millimeters (mm). Light and dark regions in the pattern 300 indicate constructive interference (peaks) and destructive interference (valleys) fringes, respectively. As shown, for a continuous wave optical beam, the fringes are symmetric and, in this example, form a circular pattern.

Figure 4A:
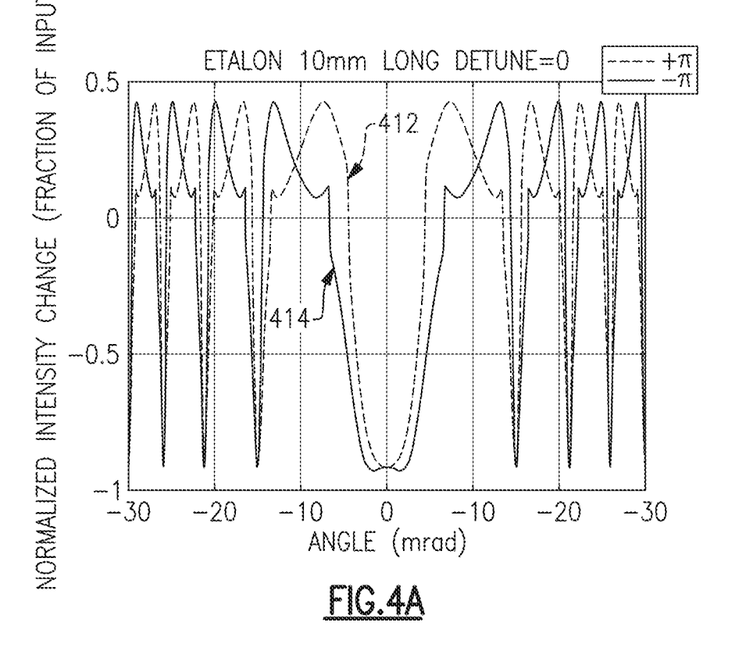
FIG. 4A is a graph illustrating an example of the transmission characteristics for positive and negative phase changes for an optical resonator operating in an on-resonance operating condition, in accord with aspects of the present invention.
Figure 4B:
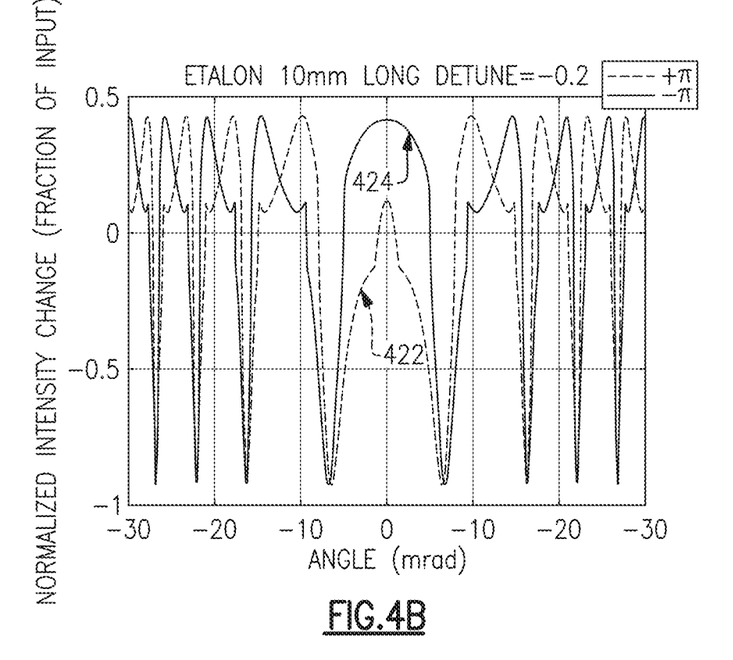
FIG. 4B is a graph illustrating an example of the transmission characteristics for positive and negative phase changes for an optical resonator operating in an off-resonance operating condition, in accord with aspects of the present invention.

FIGS. 4A and 4B are graphs showing a plot of the transmission characteristic changes for positive and negative phase changes for examples of the etalon 200. More specifically, FIG. 4A is a graph showing an example of the maximum change in intensity during phase change in the incoming modulated beam of the output optical signal 112 (as a fraction of the intensity of the input optical signal 110) as a function of angle (the angle of incidence of the input optical signal 110). In this example, the incoming optical signal 110 is a phase modulated signal, and in the graph, trace 412 represents the output optical signal 112 responsive to a +Pi phase change in the incoming optical signal 110 and trace 414 represents the output optical signal 112 responsive to a −Pi phase change in the incoming optical signal 110. In this example, the etalon 200 has an interior dimension 216 of 10 mm, and is tuned for an operating condition at normal incidence of the incoming optical signal 110.

As shown in FIG. 4A, the intensity output, or transmission response of etalon 200 to a given phase change in the incoming optical signal 110 is dependent on the angle of incidence. Thus, the etalon 200 may be tuned or adjusted to produce a particular desired intensity output change in response to a given phase change by controlling the angle of incidence of the incoming optical signal 110 at the etalon 200. In one example, this angular tuning can be achieved by rotating the etalon 200. For example, referring to FIG. 4A, to achieve a maximum intensity output from the etalon 200 in response to a +Pi phase change, the etalon can be rotated such that the incoming optical signal 110 is incident at an angle of approximately 8 milliradians (mrad) or 16 mrad, etc.

As also may be appreciated from FIGS. 3 and 4A, for a given amount of transmitted continuous-wave (CW) light in the optical signal 110, it may be unclear whether the angle of arrival of the incoming optical signal 110 is on a positive or negative slope of a given interference fringe. This ambiguity can be removed using a phase modulated incoming optical signal 110. For example, referring to FIG. 4A, traces 412 and 414, corresponding to +Pi and −Pi phase transitions in the incoming optical signal 110, respectively, overlap at certain incidence angles. Thus, by controlling the angle of incidence, for example, by rotating the etalon 200 as discussed above, this ambiguity can be removed by adjusting the etalon to an angle where there is a significant, or at least reliably observable, difference in the relative amplitudes of the transmission response to positive and negative phase changes of the incoming optical signal 110.

FIG. 4B is a graph similar to FIG. 4A, showing another example of the change in intensity of the output optical signal 112 (as a fraction of the intensity of the incoming optical signal 110) as a function of angle (the angle of incidence of the incoming optical signal 110). In this example, the incoming optical signal 110 is again a phase modulated signal, and trace 422 represents the output optical signal 112 responsive to a +Pi phase change in the incoming optical signal 110 and trace 424 represents the output optical signal 112 responsive to a −Pi phase change in the incoming optical signal 110. In this example, the etalon 200 has an interior dimension 216 of 10 mm, and is detuned for an off-resonance operating condition at normal incidence of the input optical signal 110. As may be seen with reference to FIGS. 4A and 4B, the same phase-to-intensity responses can be achieved for both on-resonance and off-resonance operating conditions of the etalon 200 at different angles.

FIGS. 4A and 4B are example plots of the transmission response of etalon 200 to a given phase change in the incoming optical signal 110. Other plots similar to 4A and 4B can be generated based on the reflection response of etalon 200 to a given phase change in the incoming optical signal 110. In some embodiments, similar plots for the reflection characteristics for +Pi and −Pi phase changes for a given optical resonator are generated to remove ambiguity between a +Pi and −Pi phase change by adjusting the etalon 200 to an angle where there is a significant, or at least reliably observable, difference in the relative amplitudes of the reflection response to positive and negative phase changes of the incoming optical signal 110.

According to certain aspects and embodiments, due to the relationship between the angle of arrival of the incoming optical signal 110 and the operating point or transmission response of the etalon 200, by rotating the etalon, the operating condition of the etalon and its associated transmission characteristic can be dynamically changed. For example, the etalon 200 can be varied between different operating conditions. Similarly, a particular desired intensity output in response to any given phase, amplitude or frequency shift in the input optical signal (corresponding to modulation of the incoming optical signal 110) can be achieved by rotating the etalon 200 to the corresponding angle that produces the desired result. Depending on the modulation format of the input optical signal, it may be desirable to optimize the etalon 200 to different operating points to produce different responses. For example, in certain modulation schemes, it may be beneficial to be able to distinguish between positive and negative phase transitions. In other examples, it may be beneficial to have a maximum intensity of the output optical signal 112 correspond to a certain transition (e.g., a phase transition of a particular amount and/or in a particular direction) and a minimum intensity correspond to a different type of transition. Knowing the angular dependence of the transmission characteristic of the etalon 200 for any given modulation transition, allows the etalon 200 to be rotated to produce the desired response. The angle of rotation can be dynamically changed to adapt to different incoming optical signals 110 with different modulation formats, for example, or changing environmental conditions.

Figure 5:
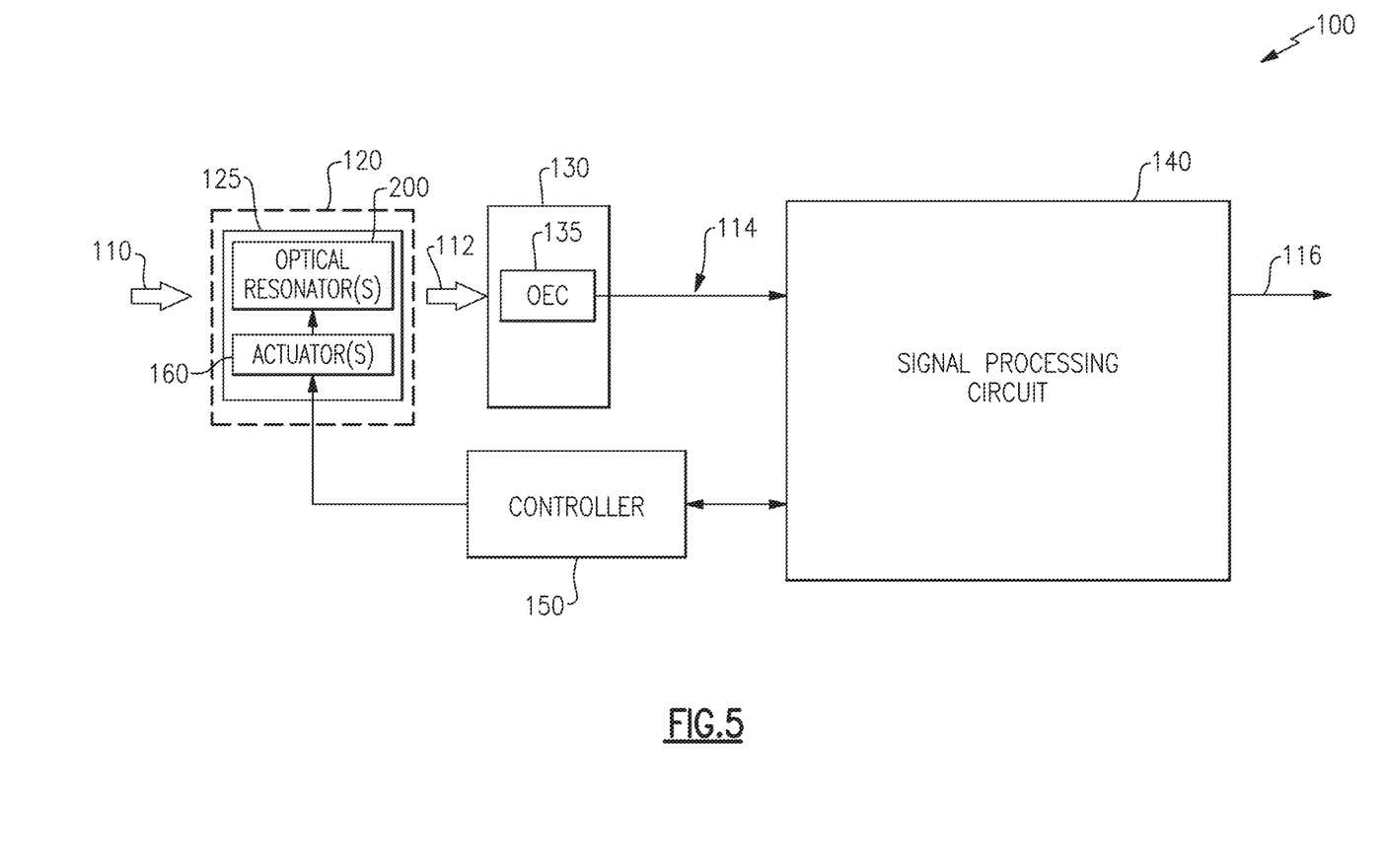
FIG. 5 is a functional block diagram of another example of an optical receiver according to certain aspects of the present invention.

FIG. 5 is a functional block diagram of another example of the optical receiver 100 discussed above with reference to FIG. 1. In this example, the optical resonator assembly 125 includes at least one actuator 160 coupled to a corresponding at least one optical resonator (e.g., etalon) 200. The actuator 160 is coupled to the controller 150. The controller 150 may provide a control signal to the actuator 160 to control the actuator to rotate the optical resonator 200 to a desired angle so as to achieve a desired operating condition of the optical resonator 200. In certain examples in which the optical resonator assembly 125 includes multiple optical resonators 200, the optical resonators may be coupled to the same actuator 160, such that all the optical resonators 200 are rotated by the same amount and at the same time, under the control of the controller 150. For example, individual ones of the multiple optical resonators 200 may be tuned to different baseline operating conditions to provide a suite of responses that can be changed together by rotating the collection of optical resonators 200 using the actuator 160. In other examples, the optical resonator assembly 125 may include multiple actuators 160, each coupled to one or more optical resonators 200. In such examples, individual ones or groups of optical resonators can be rotated to tune their desired operating conditions independently of other optical resonators 200 in the optical resonator assembly 125. It should be noted that in certain circumstances, such as when the wavefront is distorted, rotating the etalon(s) 200 may reduce the overlap of spatial coherence of the transmitted optical signal 112. However, in fiber-coupled optical receivers, there is little to no wavefront distortion from the optical fiber(s) that input the incoming optical signal 110 to the etalon(s) as the fiber(s) can be configured to provide very high beam quality, and therefore the output optical signal 112 may retain spatial coherency, even with rotation of the etalon(s) 200. Accordingly, embodiments of the optical receiver 100 may be particularly well suited to fiber-based applications or short-range free-space optical communications applications in conditions with low turbulence, where the beam of the incoming optical signal 110 is coherent with excellent beam quality.

Thus, aspects and embodiments provide an optical receiver 100 that leverages the response of one or more etalons 200 to convert the modulation (phase, frequency, and/or amplitude) of an incoming optical signal 110 into an intensity-modulated output signal 112 that can be received and decoded to extract the information encoded on the modulated incoming optical signal 110. Using one or more optical resonators that can be rotated to tune their operating conditions, a highly flexible, compact, and robust optical receiver 100 may be provided, having the capability to dynamically adjust to different modulation formats or applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical receiver comprising:
an optical resonator assembly including at least one optical resonator and at least one actuator coupled to the at least one optical resonator and configured to rotate the at least one optical resonator in response to a control signal, the at least one optical resonator being configured to receive an input optical signal, to accumulate optical signal energy inside the at least one optical resonator based at least in part on the input optical signal, and to produce an intensity modulated output optical signal, the intensity modulation of the output optical signal being representative of a modulation of the input optical signal;
a detector configured to detect the intensity modulated output optical signal and to identify the modulation of the input optical signal based at least in part on the intensity modulation of the output optical signal; and
a controller coupled to the detector and to the optical resonator assembly, the controller being configured to provide the control signal to control the at least one actuator to rotate the at least one optical resonator to tune the at least one optical resonator to a selected operating condition.

2. The optical receiver of claim 1 wherein the at least one optical resonator is a Fabry-Perot etalon.

3. The optical receiver of claim 2 wherein the at least one optical resonator includes:
a first semi-reflective surface positioned to receive the input optical signal; and
a second semi-reflective surface positioned facing the first semi-reflective surface, wherein the at least one optical resonator is configured to accumulate the optical signal energy inside the at least one optical resonator and between the first semi-reflective surface and the second semi-reflective surface to approach a steady-state output value of the output optical signal, the intensity modulation of the output optical signal including a series of deviations from the steady-state output value.

4. The optical receiver of claim 1 wherein the modulation of the input optical signal is phase modulation, frequency modulation, intensity modulation, or a combination thereof.

5. The optical receiver of claim 1 wherein the selected operating condition of the at least one optical resonator is an on-resonance operating condition of the at least one optical resonator.

6. The optical receiver of claim 1 wherein the selected operating condition of the at least one optical resonator is an off-resonance operating condition of the at least one optical resonator.

7. The optical receiver of claim 1 wherein the at least one optical resonator includes a plurality of optical resonators.

8. The optical receiver of claim 7 wherein the at least one actuator includes a plurality of actuators each coupled to at least one optical resonator of the plurality of optical resonators.

9. The optical receiver of claim 1 wherein the controller is configured to control the actuator to rotate the at least one optical resonator in response to the modulation of the input optical signal changing.

10. The optical receiver of claim 1 wherein the intensity modulated output optical signal is an optical signal reflected from the at least one optical resonator.

11. The optical receiver of claim 1 wherein the detector is further configured to identify the modulation of the input optical signal based at least in part on distinguishing between a positive and a negative phase transition of the input optical signal.

12. The optical receiver of claim 1 wherein the detector is further configured to identify the modulation of the input optical signal based at least in part on determining a maximum change in intensity of the modulated output optical signal during a phase change of the input optical signal.

13. A method of demodulating a modulated optical signal, the method comprising:
receiving the modulated optical signal with at least one optical resonator;
accumulating optical signal energy inside the at least one optical resonator based at least in part on the modulated optical signal to produce an intensity modulated output optical signal, an intensity modulation of the output optical signal being representative of the modulation of the modulated optical signal;
rotating the at least one optical resonator to tune the at least one optical resonator to a selected operating condition, the intensity modulation of the output optical signal being dependent on the operating condition of the at least one optical resonator;
detecting the intensity modulated output optical signal; and
identifying the modulation of the modulated optical signal based at least in part on the intensity modulation of the output optical signal.

14. The method of claim 13 wherein rotating the at least one optical resonator includes rotating the at least one optical resonator to select the operating condition of the at least one optical resonator based on the modulation of the modulated optical signal.

15. The method of claim 13 wherein the operating condition of the at least one optical resonator is an on-resonance operating condition of the at least one optical resonator, and wherein accumulating the optical signal energy inside the at least one optical resonator includes accumulating resonant optical signal energy inside the at least one optical resonator.

16. The method of claim 13 wherein the operating condition of the at least one optical resonator is an off-resonance operating condition of the at least one optical resonator.

17. The method of claim 13 wherein the at least one optical resonator includes a plurality of optical resonators, and wherein rotating the at least one optical resonator includes individually rotating each of the plurality of optical resonators to select different operating conditions for each of the plurality of optical resonators.

18. The method of claim 13 wherein the intensity modulated output optical signal is an optical signal reflected from the at least one optical resonator.

19. The method of claim 13 wherein identifying the modulation of the modulated optical signal based at least in part on the intensity modulation of the modulated output optical signal includes distinguishing between a positive and a negative phase transition of the modulated optical signal.

20. The method of claim 13 wherein identifying the modulation of the modulated optical signal based at least in part on the intensity modulation of the modulated output optical signal includes determining a maximum change in intensity of the modulated output optical signal during a phase change of the modulated optical signal.

* * * * *